United States Patent [19]

Boie et al.

[11] Patent Number: 4,526,043

[45] Date of Patent: Jul. 2, 1985

[54] CONFORMABLE TACTILE SENSOR

[75] Inventors: Robert A. Boie; Gabriel L. Miller, both of Westfield, N.J.

[73] Assignee: AT&T Bell Laboratories, Murray Hill, N.J.

[21] Appl. No.: 497,182

[22] Filed: May 23, 1983

[51] Int. Cl.³ .......................... G01L 1/14; G01L 5/16
[52] U.S. Cl. ................ 73/862.04; 73/862.64; 361/283; 901/46
[58] Field of Search ............... 73/172, 862.04, 862.64; 340/365 A, 365 C; 361/278, 283, 288; 901/33, 46

[56] References Cited

U.S. PATENT DOCUMENTS

| | | | |
|---|---|---|---|
| 3,538,403 | 11/1970 | Carollo | 73/432 R X |
| 3,731,192 | 5/1973 | Miller . | |
| 3,979,711 | 9/1976 | Maginness et al. . | |
| 4,208,648 | 6/1980 | Naumann | 901/46 X |
| 4,286,459 | 9/1981 | Trimmer et al. . | |
| 4,306,148 | 12/1981 | Ringwall et al. . | |
| 4,353,056 | 10/1982 | Tsikos . | |
| 4,386,312 | 5/1983 | Briefer | 73/718 X |

FOREIGN PATENT DOCUMENTS

| | | | |
|---|---|---|---|
| 3025362 | 1/1982 | Fed. Rep. of Germany | 73/862.64 |
| 153057 | 12/1979 | Japan | 361/278 |
| 155877 | 12/1979 | Japan | 73/862.04 |
| 42021 | 3/1980 | Japan | 73/862.68 |

OTHER PUBLICATIONS

"A Force Transducer Employing Conductive Silicone Rubber", *The 1st International Conference on Robot Vision and Sensory Controls,* 1981, pp. 73-79.
"A New Capacitive Transducer System for Measuring Force Distribution Statically and Dynamically", *Transducer Tempcon '81 Conference,* 1981, pp. 1-32.
MC68000 16-Bit Microprocessor User's Manual, 1980, (Cover Sheet).

*Primary Examiner*—Charles A. Ruehl
*Attorney, Agent, or Firm*—Jack S. Cubert

[57] ABSTRACT

A force sensor includes an elastic dielectric, a first plurality of conductive elements on one side of the dielectric and a second plurality of conductive elements on the opposite side of the dielectric. First signals are applied to one plurality of conductive elements through nonconductive coupling. Second signals representative of the forces on said elastic dielectric are generated responsive to the applied first signals coupled to the other plurality of conductive elements.

5 Claims, 7 Drawing Figures

PHASE SENSITIVE DETECTOR

CONFORMABLE TACTILE SENSOR

FIELD OF THE INVENTION

Our invention relates to sensor apparatus and, more particularly, to force sensor arrangements.

BACKGROUND OF THE INVENTION

In manufacturing, control, data processing and other fields, it is often desirable to generate signals representative of the force or pressure exerted on an object by a person, machine part or robot member. A response proportional to the pressure may then be obtained or the machine part or robot member can then be adjusted so that the object is handled properly. Such force sensing may also be used to determine the shape or position of an object by means of the pressure distribution over the sensor surface. In a robotics application, a force sensor is preferably located on the extremity of a gripping element. Such a sensor should be rugged, be adaptable to the shape of the element on which it is mounted and have spatial resolution compatible with its intended uses.

Several types of tactile type force sensors have been developed. The arrangement described in U.S. Pat. No. 4,286,459 issued to W. S. N. Trimmer et al on Sept. 1, 1981 utilizes a flexible piezoelectric material having conductive coatings. A force applied to the material causes a change in dimension so that the frequency of oscillation of the piezoelectric material is a function of the applied force. A system disclosed in U.S. Pat. No. 4,306,148 issued to C. G. Ringwall et al on Dec. 15, 1981 determines the air flow through an array of pneumatic flow passages by directing a beam of light on metallic tabs mounted on an elastic pad in the air stream and monitoring the light reflected therefrom. The force directed against selected portions of the elastic pad can thereby be detected. U.S. Pat. No. 3,979,711 issued to M. G. Maginness et al on Sept. 7, 1976 discloses an ultrasonic array and imaging system that may selectively scan an object to provide a detailed image over an extensive area.

A more direct approach to tactile sensing is described in the article "A Force Transducer Employing Conductive Silicone Rubber", pp. 73-80, by John A. Purbrick, *Proceedings of the First International Conference on Robot Vision and Sensory Controls*, published in 1982 by IFS Ltd., Bedford, England. The arrangement suggested therein utilizes a two-layer array each of which comprises a set of parallel silicone rubber bars. The bars of one layer are orthogonally oriented with respect to the bars of the other layer so that a grid of crosspoints is defined. The force exerted on each crosspoint determines the electrical resistance through the path including the crosspoint and the bar pair associated therewith. Other resistive tactile sensing devices use various configurations of conductors and deformable resistive sheets to sense the force exerted on portions of the device. It has been observed, however, that preferred materials such as silicone rubber exhibit non-linear and hysteresis characteristics that affect resistance measurements reflecting the pressure being sensed and that electrical connections to the resistive sheets adversely affect the accuracy of the measurements. The resulting distortions of force distribution have limited the utility of such resistive tactile sensors.

It is well known that the capacitance between a pair of conductors varies inversely as the distance between the conductors. This principle has been employed in the construction of strain gauges to measure applied forces and has even been extended to fingerprint sensing as disclosed in U.S. Pat. No. 4,353,056 issued to C. Tsikos on Oct. 5, 1982. The Tsikos arrangement includes a flexible insulator sandwiched between a flexible electrode and a flat sheet which comprises a large number of small spaced flat metal plates. Each plate is separately connected to multiplexing apparatus so that the voltage distribution across the plates can be measured. In this manner, individual ridges and valleys of a fingerprint are sensed. While the multitude of individual metal plates may perform the task of sensing contours of a finger pressed against a flat sheet, the large number of conductors and the interconnection arrangements needed to connect the sensor to electronic processing equipment detract from its utility in other sensing applications such as those in which the sensor must conform to nonplanar surfaces that are subjected to varying degrees of stress.

The article "A New Capacitive Transducer System for Measuring Force Distribution Statically and Dynamically" by Prof. K. Nicol appearing in the *Proceedings of the Transducer Tempcon 81 Conference*, dated June 10, 1981 discloses a matrix array of capacitors with elastic dielectrics used to determine force distribution by measuring capacitive change resulting from changes in the distances between the capacitance electrodes. While the Nicol arrangement substantially reduces the number of interconnections, each connection point to the electrode matrix must complete a conductive path. Consequently, making changes to the array requires a relatively complex procedure and reliability of the connection points is not assured. Additionally, a bridge type circuit is utilized to determine the capacitances of the matrix crossing which requires relatively complex analysis arrangements. It is an object of the invention to provide an improved tactile sensing arrangement adapted to conform to a variety of shapes and orientations, to be easily replaceable, and to perform wide range force imaging.

BRIEF SUMMARY OF THE INVENTION

A force sensor includes an elastic dielectric placed between one plurality of separated conductive elements and another plurality of separated conducting elements. First signals are applied to one of the plurality of conductive elements. Signals corresponding to the forces on the elastic dielectric are generated responsive to said first signals.

According to one aspect of the invention, the first signals are nonconductively coupled to one of the plurality of conductive elements.

According to another aspect of the invention, the two pluralities of conductive elements are coupled to the feedback path of an amplifier whereby the amplifier output responsive to the predetermined signal is directly proportional to separation between the two pluralities of conductive elements at predetermined positions.

DETAILED DESCRIPTION

Figure 1:
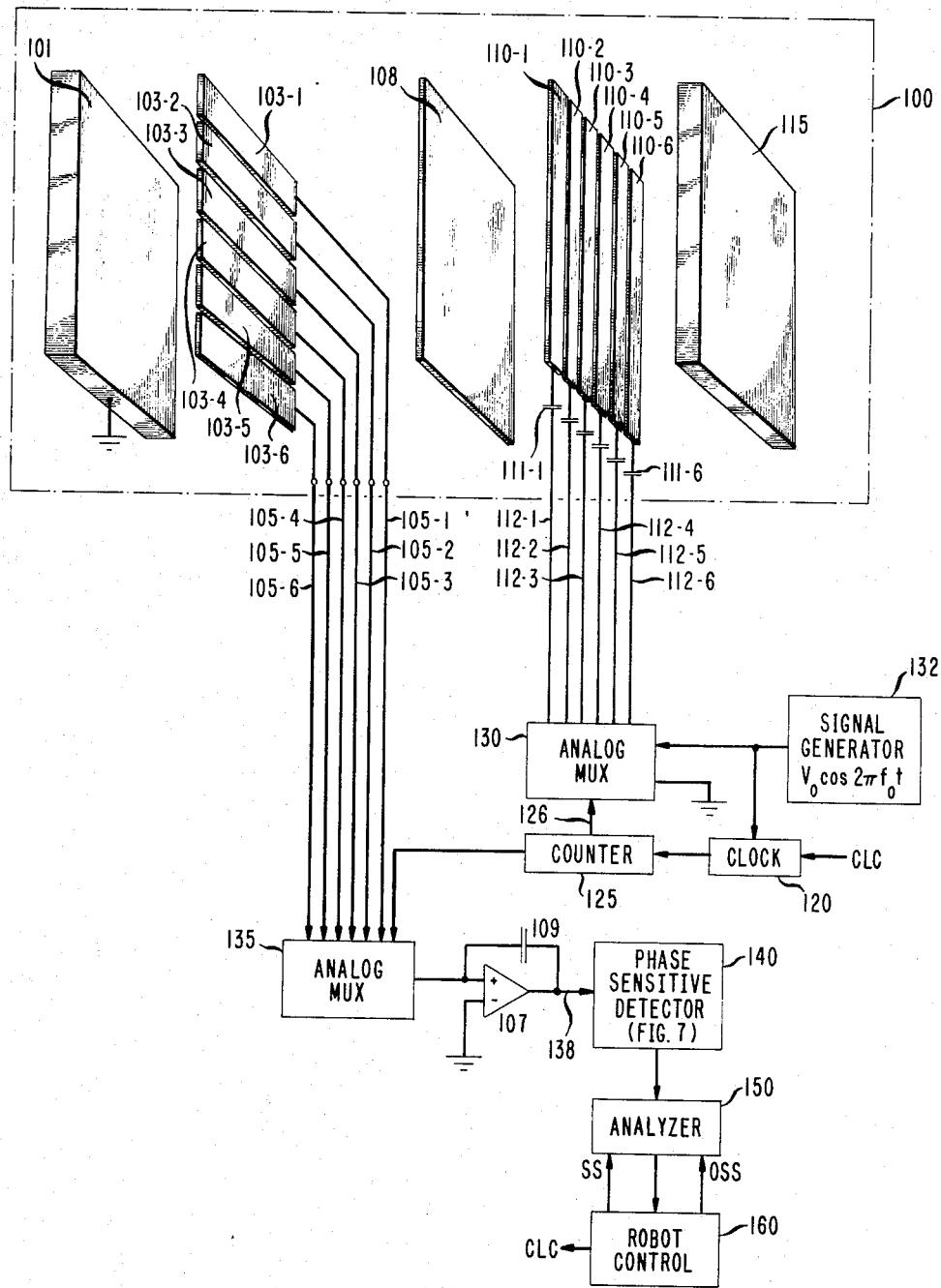
FIG. 1 depicts a force sensor arrangement illustrative of the invention.

FIG. 1 shows a tactile type force sensor adapted to be attached to a robotic element and electronic circuitry associated therewith. Referring to FIG. 1, the sensor comprises compliant insulative layer 115 on one surface of which compliant metal strips 110-1 through 110-6 are arranged in parallel, elastic dielectric layer 108, and conformable base 101 on which conformable metal strips 103-1 through 103-6 are arranged in parallel. The compliant layer and strips are adapted to return to their unstressed positions after deformation and the conformable layer and strips are deformable to adjust to the shape of the base. Base 101 may be mounted on a extremity of a robotic gripper member (not shown) so that the base conforms to the shape of the gripper extremity. Metal strips 103-1 through 103-6 are oriented orthogonally to metal strips 110-1 through 110-6 and the two sets of strips are separated by elastic dielectric 108. Dielectric 108 may comprise a solid, foam, mesh or other material having elastic properties. The dielectric should, preferably exhibit a low point spread characteristic so that compression at a crosspoint of the two sets of strips does not affect the separation between strips elsewhere in the tactile sensor. A foam type material or a randomly woven mesh material meets this requirement. In its unstressed state, dielectric 108 provides a separation of $d_0$ and each crossing of the orthogonal metal strips exhibits a capacitance of $$C_0(i,j) = KA/4\pi d_0(i,j). \qquad (1)$$

Where K is the dielectric constant of the elastic layer, A is the area of the metallic strip crossing and $d_0(i,j)$ is the separation between metallic strips i and j at the crossing.

An object in contact with insulative layer 115 causes dielectric layer 108 to deform so that the separation of the orthogonal metal strips at each crossing varies as a function of the force applied to the crossing. The force applied to each crossing, $F(i,j)$, produces a proportional change in the thickness of elastic layer 108 in accordance with $$d_F(i,j) = (1/k)(F(i,j)) \qquad (2)$$

where k is the elastic spacing constant of layer 108. The force, displacement and capacitance of each crossing are related by $$1/C(i,j) = (4\pi/KA)(d_0(i,j) - d_F(i,j)) \qquad (3)$$

$$F(i,j) = (kKA/4\pi)(1/C_0(i,j) - 1/C(i,j)). \qquad (4)$$

Thus an image of the distribution of the contact force on the dielectric layer can be derived from measurement of the capacitances $C(i,j)$ or the capacitive impedances of the crossings.

The conductive element array including metal strips 103-1 through 103-6 and 110-1 through 110-6 is scanned to obtain an image of the force distribution resulting from contact between the object and plate 115. The scanning produces a sequence of 36 electrical signals, each of which is a function of the thickness of dielectric sheet 108 at a predetermined crosspoint. The scanning arrangement in FIG. 1 includes voltage generator 132, clock 120, counter circuit 125, and analog multiplexers 130 and 135. Voltage generator 132 produces a signal $V_0 \cos 2\pi f_0 t$ that is applied to analog multiplexer 130 and clock 120. The clock comprises a divide by N counter that supplies a pulse to the input of counter 125 for every sequence of N cycles of the output of generator 132. Responsive to the pulse train from clock 120, the counter is sequentially incremented from zero to 35 for the 6-by-6 metallic strip array and is then reset. In this way, 36 separate time intervals, $\tau_n$ (n=1,2, ..., 36), are defined. Each time interval is dedicated to generating a signal representative of the separation between a predetermined pair of metallic strips i,j at their crossing and determining therefrom the force applied to the crossing.

The output signals of counter 125 are applied to the address inputs of analog multiplexer 130 via line 126 so that voltage source 132 is connected to each of lines 112-1 through 112-6 for a sequence of six time intervals in which all other lines are connected to ground potential. Lines 112-1 through 112-6 are coupled to lines 110-1 through 110-6 via capacitor structures 111-6 through 111-6. During the six time intervals that voltage $V_0 \cos 2\pi f_0 t$ is applied to one of metallic strips 110-1 through 110-6, analog multiplexer 135 is sequenced through its six states by the output signals from counter 125 on line 128. In this manner, a series of signals appears on line 138 each of which corresponds to $$V_A = (-V_D \cos 2\pi f_0 t)(C(i,j)/C_A) \qquad (5)$$

where $C_A$ is the capacitance of amplifier feedback capacitor 109, i is the selected one of strips 110-1 through 110-6 and j ranges over the sequentially selected metallic strips 103-1 through 103-6.

Consider the operation of the sensor in FIG. 1 when analog multiplexer 130 connects voltage source 132 to metal strip 110-1 via lead 112-1 and capacitive structure 111-1 and analog multiplexer 135 connects metal strip 103-1 to the positive input of operational amplifier 107 via lead 105-1. The capacitance $C(1,1)$ at the crossing between strip 110-1 and strip 103-1 causes the signal at the output of amplifier 107 to be $V_A(1,1)$. As the address signals to analog multiplexer 135 are sequenced, the signals at the input of amplifier 107 correspond to the current transferred through the crossing capacitances from metal strip 110-1 to strips 103-1 through 103-6, respectively.

Figure 7:
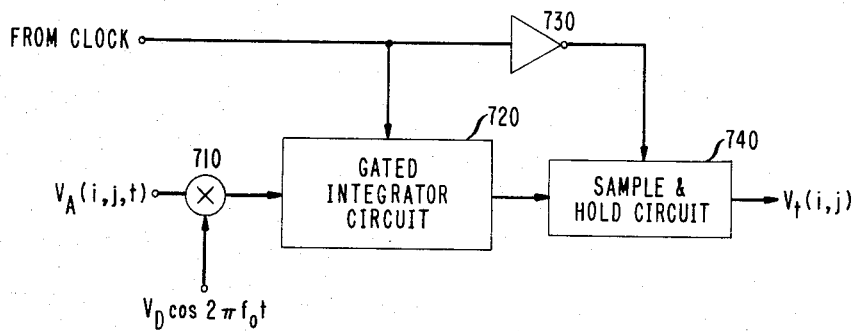
FIG. 7 shows a block diagram of a phase sensitive detector circuit useful in the force sensor arrangements of FIGS. 1, 2, and 4.

As is readily seen from equations (3) and (4), the output of the integrator type amplifier is an inverse function of the displacement of elastic layer 108 responsive to forces exerted on the crossing. Analog multiplexer 135 sequentially samples lines 105-1 through 105-6 and applies the series of signals to detector circuit 140 via amplifier 107. Circuit 140 shown in greater detail in FIG. 7 is operative to determine the capacitances of the addressed crossings which capacitances are inversely proportional to the separation of the crossings of the addressed bars. Sequential switching of multiplexers 130 and 135 provides a series of 36 signals to detector circuit 140 which signals represent an image of the displacement of elastic layer 108.

Referring to FIG. 7, the phase sensitive detector therein comprises analog multiplier 710, gated integrator circuit 720, inverter circuit 730 and sample and hold circuit 740. A signal $V_D \cos 2\pi f_0 t$ is obtained from signal generator 132 and is supplied to analog multiplier 710 together with the output signal from amplifier 107.

The output signal of multiplier 710 during a particular time interval $\tau_n$ is $$V_D(C(i,j)/C_A) \cos^2(2\pi f_0 t) \quad (6)$$

The duration of time interval $\tau_n$ is determined by the period between clock pulses generated in clock 120 which is a multiple N of the period $1/f_0$. Gated integrator circuit 720 is reset at the beginning of each $\tau_n$ interval so that the output of the integrator in the time interval is the integral of equation (6). The output of the integrator is sampled by sample and hold circuit 740 during the clock pulse terminating the current $\tau_n$ interval. Consequently, the output of the sample and hold circuit at the end of the interval $\tau_n$ is $$V_t(i,j) = W(C(i,j)/C_A) \quad (7)$$

where W is a constant $N\tau V_D$. W is the same for all $\tau_n$ intervals. Thus, signal $V_t(i,j)$ is representative of $C(i,j)$ which is inversely proportional to the separation between metal strips at crossing i,j as per equation (3).

Analyzer 150 is adapted to convert the signals from circuit 140 into a force image signal. The force image signal, in turn, may be used to control robot movement via robot control circuit 160. The analyzer may comprise an analog-to-digital converter and a digital signal processor such as the MC68000 microprocessor described in *MC68000 User's Manual*, 3rd Edition, MC68000UM(AD3) Motorola Edition, Prentice Hall, Englewood Cliffs, N.J. (1982). The processor includes a read only memory that stores a set of program instruction codes designed to perform the force imaging operations. It is to be understood that other analyzer arrangements well known in the art may also be employed.

Figure 5:
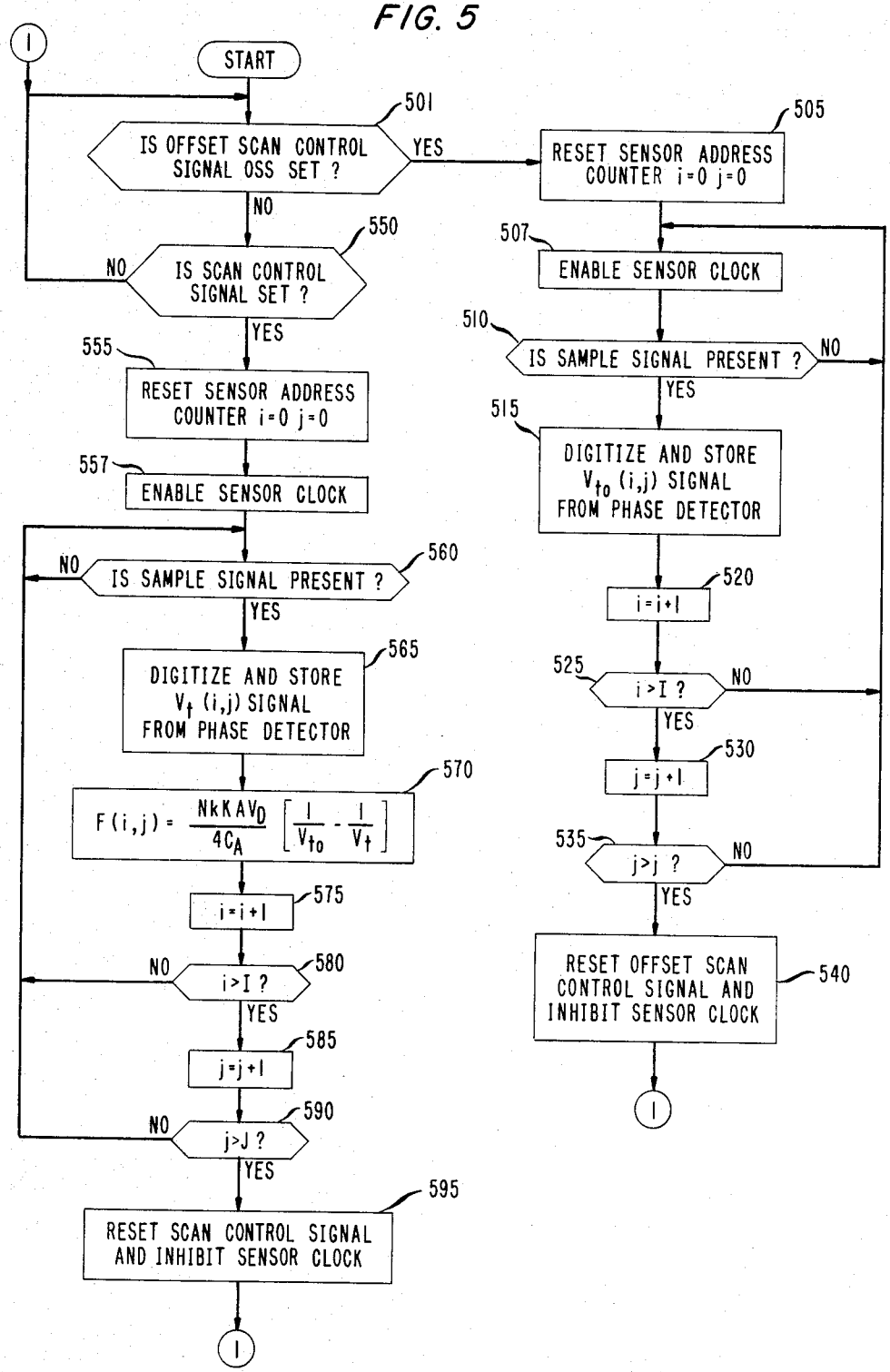
FIGS. 5 and 6 show flowcharts illustrating the analysis operations depicted in FIGS. 1, 2 and 4.

The flowchart of FIG. 5 illustrates force imaging operations that are performed in analyzer 150. Referring to FIG. 5, decision box 501 is entered when the tactile sensor circuit of FIG. 1 is turned on and is operative to detect if an offset control signal OSS has been set in robot control 160. The OSS signal is generated to initiate the calibration of tactile sensor 100. Such calibration is necessary when a tactile sensor is installed or replaced and may comprise generating a set of offset voltage signals $V_{t0}$ corresponding to the zero applied force condition as in FIG. 5. It is to be understood, however, that other calibration procedures well known in the art may also be used.

Responsive to the setting of signal OSS, crosspoint indices i and j are reset to zero as per box 505, clock 120 is enabled (box 507) and box 510 is activated to await the occurrence of a sample signal from detector 140. Responsive to the first sample signal, analyzer 150 is operative to convert the signal $V_{t0}$ from detector 140 to a digital coded form and to store the digitized signal in the (0,0) position of an offset table therein. Index i is incremented in box 520 and the signal $V_{t0}(1,0)$ is stored in the (1,0) offset table position. After the first row of the tactile sensor has been scanned, box 530 is activated via box 525 so that index $j=1$ and the offset voltage values for crosspoints 0,1 through 5,1 are stored in the offset table of the random access memory of analyzer 150. When the offset scan operation has been completed, box 540 is entered via decision box 535, signal OSS is reset and box 501 is reentered.

During the operation of the robot mechanism, tactile sensing may be required in connection with handling objects. Whenever scan control signal SS is set by robot control 160, tactile sensor scanning is initiated via box 550. Crosspoint indices i and j are reset as per box 555 and sensor clock 120 is activated as per box 557. When the first sample signal from detector 140 is received by analyzer 150, the detector output signal $V_t(0,0)$ is digitized in analyzer 150 (box 565) and temporarily stored therein. A signal corresponding to the force F(0,0) at the 0,0 crosspoint is generated responsive to the offset table signal $V_{t0}$ and digitized signal $V_t$ as per box 570. Index i is incremented in box 575 and box 560 is reentered so that signal F(1,0) can be generated via boxes 560, 565, and 570. After the F(5,0) signal is produced and stored, control is passed to box 585 via decision box 580 and the scan of the next tactile sensor row is started via box 560.

Upon generation of signal F(5,5) for the last crosspoint of the tactile sensor, box 595 is entered through box 590, the SS signal in control 160 is reset and clock 120 is inhibited. The loop including decision boxes 501 and 550 is then entered until either an OSS or an SS signal is produced in robot control 160. At this time, the force pattern generated by the scan operation is stored in analyzer 150 for use by robot control 160. The scan operation may be repeated as required.

Figure 2:
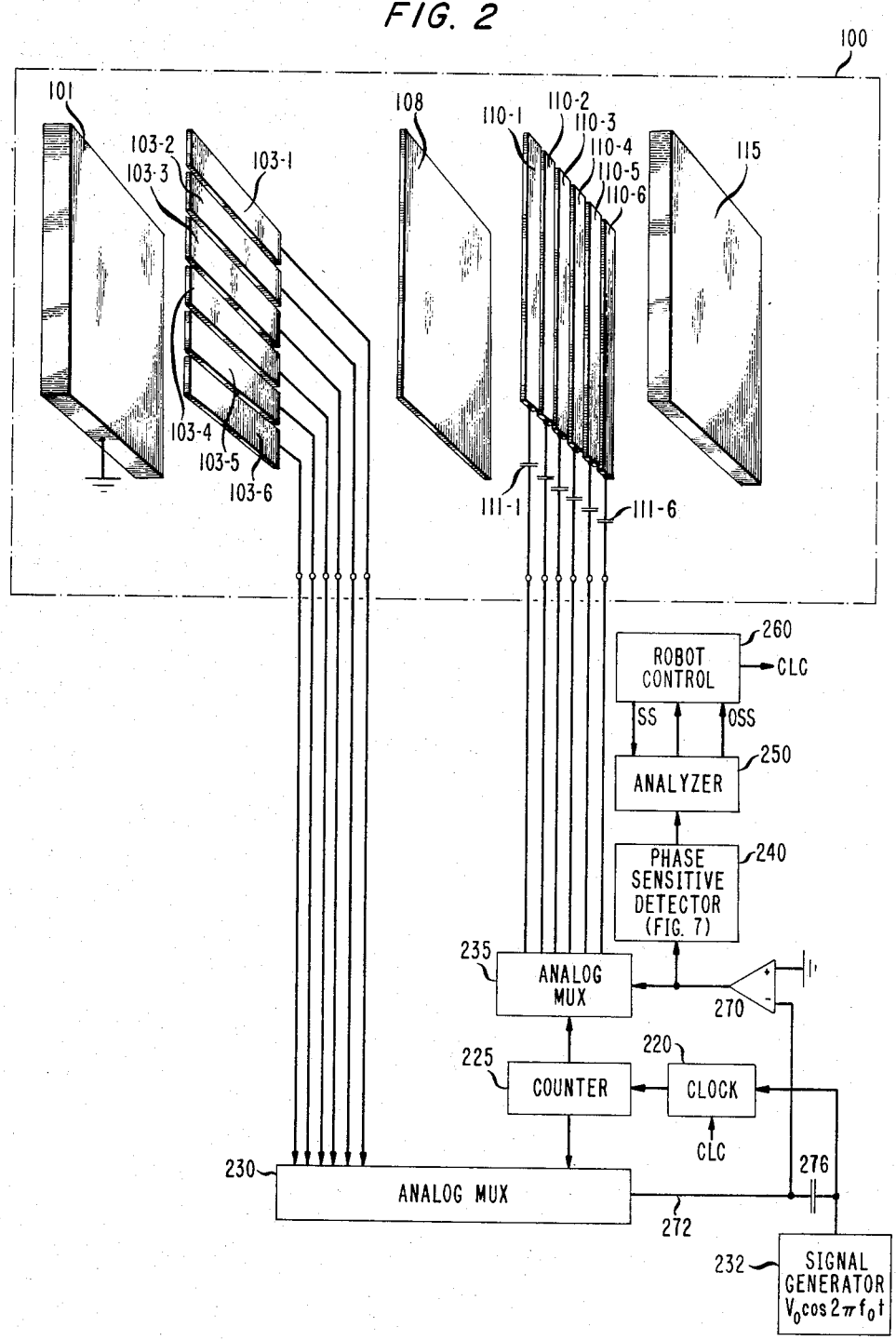
FIG. 2 depicts another force sensor arrangement illustrative of the invention.

The output signals obtained from detector circuit 140 in FIG. 1 are inversely proportional to the thickness of elastic layer 108 at the crossings of conductor sets 103 and 110. FIG. 2 shows another tactile sensor arrangement illustrative of the invention that provides output signals directly proportional to the elastic layer thickness. In FIG. 2, the sensor assembly 100 is identical to that of FIG. 1. Clock 220, counter 225, and analog multiplexers 230 and 235 perform the crossing selection function substantially as described with respect to FIG. 1. Line 272 connects the output of analog multiplexer 230 to the negative input terminal of amplifier 270 and couples voltage $V_D$ from voltage source 232 to the negative input of amplifier 270 via capacitor 276. The positive input of amplifier 270 is connected to ground potential.

Clock circuit 220 generates pulses at a predetermined rate when enabled by signal CLC from robot control 260. Responsive to the clock pulses, counter 225 is repetitively incremented from its zero state to its 35th state. Analog multiplexer 235 receives addressing signals from counter 225 so that each metallic bar of bars 110-1 through 110-6 is connected to the output of amplifier 270 via capacitive couplers 111-1 through 111-6 during six successive states of counter 225. The addressing signals applied to analog multiplexer 230 from counter 225 cause metallic bars 103-1 through 103-6 to be connected to the negative input amplifier 270 in sequence. Each of bars 103-1 through 103-6 is connected to counter 225 for a single state of counter 225 during an interval $\tau_n$. In this way, the capacitance between the negative input of operational amplifier 270 and its output is switched among the crossings of bars 103-1 through 103-6 and bars 110-1 and 110-6. Thus, when counter 225 is in its zero state, the capacitance at the crossing of bars 103-1 and 110-1 is the feedback capacitance of amplifier 270 since the capacitance of coupler 111-1 is much larger than the conductor crossing capacitance. As the count progresses, the crossings of sensor 100 are sequentially connected to amplifier 270 via multiplexers 230 and 235 and the output of the amplifier is a series of signals $$V_A(i,j,t) = -V_D \cos (2\pi f_0 t) C_A/C(i,j) \qquad (8)$$

where i is the selected bar of bars 110-1 through 110-6, j is the selected bar of bars 103-1 through 103-6.

When an object is pressed against compliant cover 115, elastic layer 108 is compressed responsive to the shape of the object. The separation between bars at the crossings as reflected in signals $V_A(i,j)$ is representative of the force image caused by the pressure of the object on the sensor. The signals $V_A(i,j)$ are applied to phase detector circuit 240 which is shown in detail in FIG. 7. The circuit of FIG. 7 operates as described with respect to FIG. 1. The output signal therefrom, however, is directly proportional to the dielectric layer thickness of the selected crossing i,j. The output in each $\tau_n$ interval of phase detector 240 is $$V_t(i,j) = W(C_A/C(i,j)) \qquad (9)$$

Signals $V_t(i,j)$ are processed in the analyzer as previously described with respect to FIG. 1 and output signals therefrom are supplied to robot control unit 260. The control unit thereby receives signals corresponding to the force pattern on sensor 100.

Figure 6:
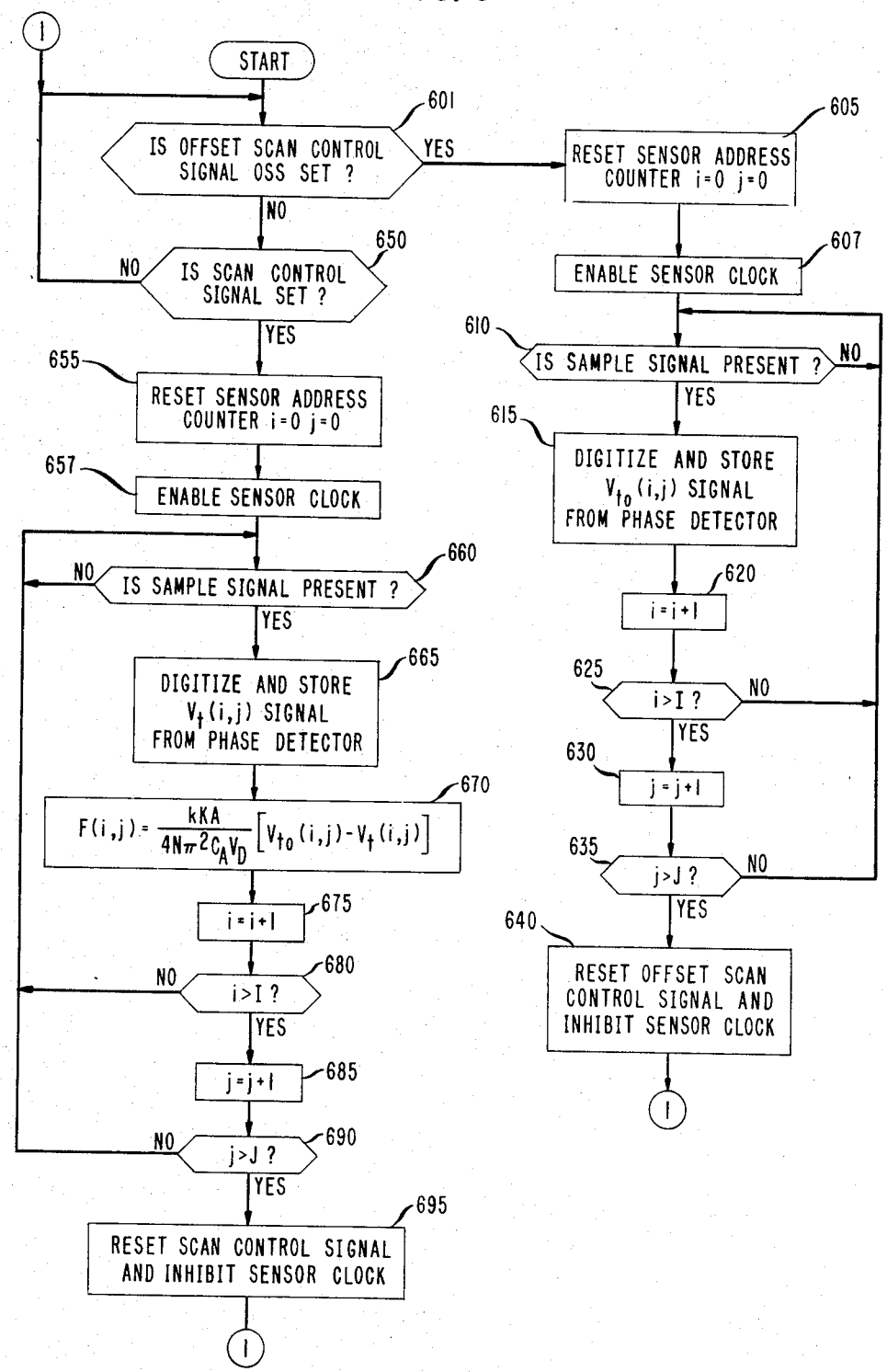

FIG. 6 shows a flowchart illustrating the operation of the tactile sensor circuit of FIG. 2. The arrangement of FIG. 6 is substantially similar to that of FIG. 5 except that the force signal F(i,j) generated in box 670 is directly proportional to the the voltage signal obtained from the crosspoint i,j rather than inversely proportional thereto. Referring to FIG. 6, the loop including decision boxes 601 and 650 is entered upon turn-on of the circuit of FIG. 2. When analyzer 250 receives a scan control signal OSS from robot control 260, crosspoint indices i and j are reset to zero as per box 605 and a clock enable signal CLC is applied to clock 220 from the robot control (box 607). Responsive to a sample signal from detector 240 (box 610), box 615 is entered and the output signal $V_{t0}(0,0)$ from the detector is stored in the offset voltage table memory portion of analyzer 250. The crosspoint indices i and j are changed in accordance with boxes 620, 625, 630 and 635 so that the sequence of crosspoint offset voltages are obtained and stored in the offset voltage table. Upon completion of the last crosspoint storage operation, the offset scan signal is reset, the sensor clock is disabled (box 640) and box 601 is reentered.

The tactile sensor scan operation is initiated via box 650 when the SS scan control signal is set in robot control 260. After the sensor address counter indices are reset in box 655 and the sensor clock is enabled by the robot control in box 657, the sequence of $V_t(i,j)$ output signals from detector 240 are supplied to analyzer 250. The force signals F(i,j) are generated in the analyzer and are sent to robot control 260 as per boxes 660, 665, 670, 675, 680, 685, and 690. After the scan is completed, the scan control signal is reset, the sensor clock is inhibited (box 695) and box 601 is reentered. The force image produced in analyzer 260 may then be utilized by robot control 260 to perform any of the handling functions that are well known in the robotics art.

Sensor 100 in FIGS. 1 and 2 is a matrix array adapted for mounting on a robotic type gripper. Alternatively, sensor 100 may be adapted to fit between joints of a robotic structure to monitor stresses therein. The array may have ⅛ inch width metallic strips with a 20 mil spacing between strips and may utilize a dielectric material that is of the order of 0.1 mm thick. The size of each crossing can be as small as 1 mm by 1 mm so that high resolution may be provided. Interconnections between a high density crossing array and electronic circuitry such as the analog multiplexers of FIGS. 1 and 2 are necessarily small and pose problems in reliability in an industrial environment. Of particular concern is the wear of the cover layer and the outer metallic bar arrangement connected thereto and the need for periodic replacement of these elements.

Figure 3:
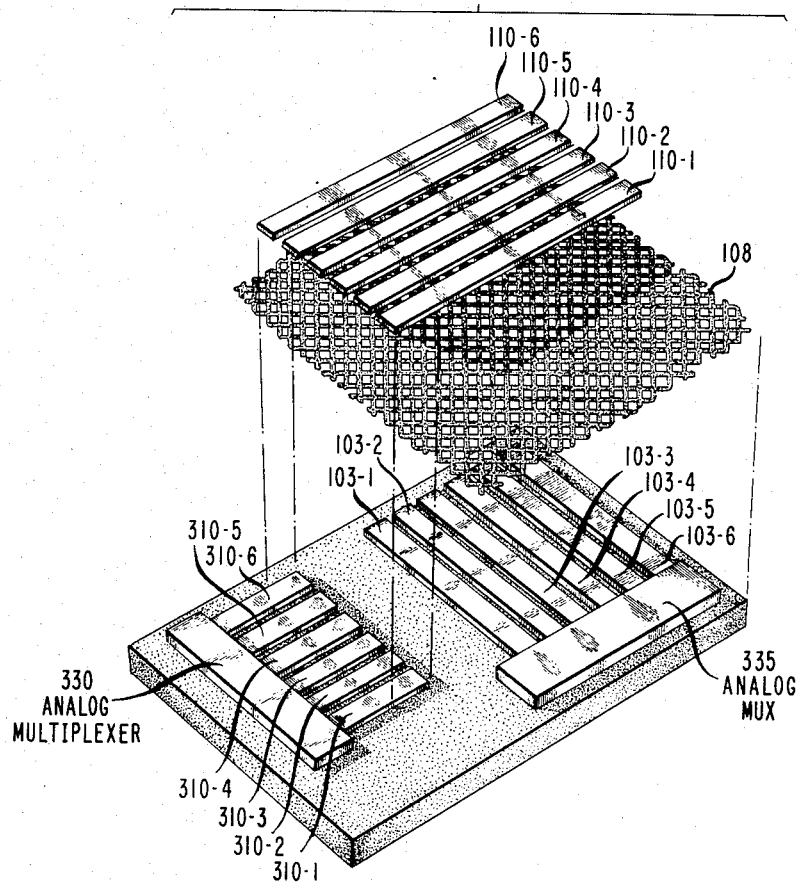
FIG. 3 illustrates conductor interconnection arrangements that may be used in the force sensors of FIGS. 1 and 2.

In accordance with the invention, the sensor connection arrangements of FIGS. 1 and 2 permit more reliable interconnections and obviate the complexity of replacing worn sensor elements. FIG. 3 shows the physical arrangement of sensor 100 in which metallic bars 103-1 through 103-6 form part of a flexible printed circuit 301 on which electronic components such as analog multiplexers 330 and 335 are mounted. Metallic bars 110-1 through 110-6 are separated from flexible printed circuit 301 by elastic layer 108. Printed circuit 301 also includes a set of metallic bars 310-1 through 310-6 which are aligned with bars 110-1 and 110-6 over an area substantially larger than the crossing area. Bars 110-1 through 110-6 are capacitively coupled to corresponding bars 310-1 through 310-6 via elastic layer 108. This capacitive coupling is indicated by capacitive structures 111-1 through 111-6 in FIGS. 1 and 2. Layer 108 is relatively thin, each of bars 110-1 through 110-6 is closely coupled to the corresponding bar of bars 310-1 through 310-6 but is isolated from the other bars. Bars 103-1 through 103-6 are permanently connected to analog multiplexer 335 but may also be capacitively coupled through capacitive structures similar to 111-1 through 111-6. Since the capacitances of the crossings between the orthogonal bar array are substantially smaller than the coupling capacitances of bars 110-1 through 110-6 and 310-1 through 310-6, the sensitivity of the sensor to changes in elastic layer thickness at the crossings is not significantly altered. Replacement of worn cover layer and the adjacent metallic bars may be readily accomplished by peeling off the old set of layers and adhering a new set of layers. Alternatively, the cover layer, metal bars on one surface thereof and dielectric energy 108 only form a structure that is removably adhered to plate 301 and the metallic bar arrangement thereon.

The tactile sensor arrangements of FIGS. 1 and 2 are particularly adapted to be attached to robotic members such as grippers to obtain an image of the forces exerted on the member by objects. As is well known in the art, such force images are useful in controlling the handling of an object, determining slippage of an object, and identifying the object. While the sets of metallic bars in FIGS. 1 and 2 are spaced parallel conductors in orthogonal relationship, many other geometrical arrangements are possible. For example, one set of conductors may comprise concentric circular strips and the other set may comprise curved strips orthogonal thereto. Such alternative geometries are very useful in identifying objects having particular shapes. It is to be understood, that the invention may be used in many other tactile sensing applications besides robotics.

Figure 4:
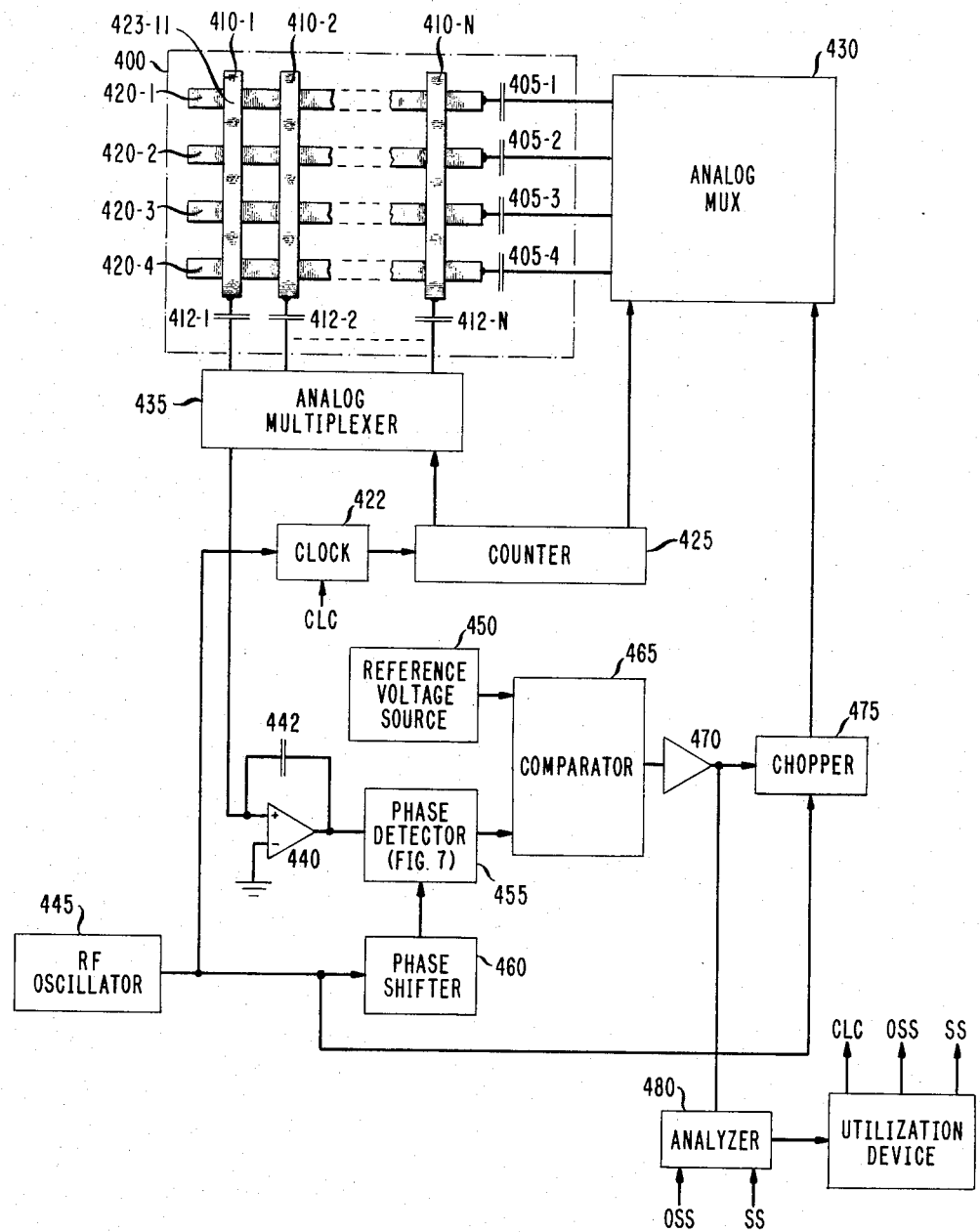
FIG. 4 depicts yet another force sensor arrangement illustrative of the invention.

FIG. 4 shows another form of tactile sensor in accordance with the invention which is useful in keyboard arrangements for control systems, musical instruments or data processing equipment. Referring to FIG. 4, sensor 400 comprises a set of spaced compliant vertical bars 410-1 through 410-N and a set of spaced conformable horizontal bars 420-1 through 420-4. As described with respect to FIGS. 1 and 2, an elastic dielectric sheet is inserted between the two orthogonal sets of bars and a compliant insulative sheet covers bars 410-1 through 410-N. The spacing between bars in sensor 400 may be specified to permit individual crossings to be manipulated by an operator. While a rectangular configuration is employed, other array forms well known in the art may also be used. For example, a single line configuration suitable for a musical instrument may be used. The signal obtained from each crossing is a function of the force applied thereto so that various effects may be obtained from the combined output of the sensor.

Clock 422 and counter 425 are adapted to generate and apply a predetermined sequence of addressing signals to analog multiplexers 430 and 435 as described with respect to FIGS. 1 and 2. In this manner, each crossing of bars 410-1 through 410-N and 420-1 and 420-4 is addressed for a distinct time interval in a prescribed scan sequence. While a crossing, e.g., 423-11 is addressed, analog multiplexer 430 connects the output of chopper circuit 475 to horizontal bar 420-1 via capacitive coupler 405-1 and analog multiplexer 435 connects vertical bar 410-1 via capacitive coupler 412-1 to the positive input of operational amplifier 440.

The circuit arrangement between the amplifier 440 and chopper circuit 475 is operative to determine the capacitive impedance of crossing 423-11 which impedance is responsive to the force applied to the elastic dielectric at said crossing. This circuit utilizes a feedback scheme similar to those disclosed in U.S. Pat. No. 3,731,192 issued to G. L. Miller on May 1, 1973 for analyzing semiconductors. RF oscillator 445 is operative to produce a constant voltage signal $V_0$ at a prescribed frequency $f_0$. A signal at frequency $f_0$ is supplied to bar 410-1 via chopper 475, and analog multiplexer 430. Responsive to the $f_0$ signal on bar 410-1, an $f_0$ frequency current is coupled through the capacitance of crossing 423-11 to the negative input of operational amplifier 440. RF oscillator 445 also drives clock 422 so that the clock pulse repetition rate corresponds to N cycles of frequency $f_0$.

In accordance with the well-known principles of operational amplifiers, the frequency $f_0$ current flowing through the crossing capacitance into the negative input of amplifier 440 is the same as the current in feedback impedance 442 and the voltage at the amplifier negative input is at virtual ground. The $f_0$ frequency voltage at the output of operational amplifier 440 is phase detected in detector 455 as described with respect to FIG. 7 and the output thereof is compared to a constant reference voltage from source 450 in comparator 465. Deviations from the current through feedback impedance 442 determined by the reference voltage results in a change in the output of the comparator. Consequently, the voltage at the output of amplifier 470 is representative of the capacitive impedance of crossing 422-11.

During the scan of the crossings of vertical conductors 410-1 through 410-4 and horizontal conductors 420-1 through 420-N, the sequence of signals at the output of amplifier 470 correspond to the capacitive impedances $C(i,j)$ of the crossings $i,j$. Each crossing is assigned a time interval in the addressing sequence of multiplexers 430 and 435 so that analyzer 480 is operative to develop a set of force signals representative of the forces on the crosspoint "keys". Analyzer 480 may comprise the microprocessor arrangements described with respect to FIGS. 1 and 2 and operate in a manner similar to that illustrated in the flowchart of FIG. 6.

While the invention has been shown and described with reference to particular illustrative embodiments, it is to be understood that various modifications and changes may be made by those skilled in the art without departing from its spirit and scope. For example, the tactile sensor arrangements may be utilized as a touch screen control by making the layers of the sensor and the conductive elements transparent as is well known in the art. Advantageously, the number of areas into which a touch screen made in accordance with the invention can be partitioned for control purposes is very large since the center point of the area that is depressed can be accurately determined. A touch tablet for use in computer control schemes can be similarly constructed in accordance with the principles of the invention.

What is claimed is:

1. A force sensor comprising:
   an elastic dielectric;
   a plurality of conductive elements on one side of said elastic dielectric;
   a plurality of conductive elements on the opposite side of said elastic dielectric;
   means for applying first signals to one plurality of conductive elements;
   means coupled to said other plurality of conductive elements responsive to said first signals for generating second signals representative of the forces on said elastic dielectric;
   wherein said first signal applying means comprises a plurality of first signal supplying conductive elements terminating on the opposite side of said elastic dielectric for coupling said first signals to said one plurality of conductive elements through said elastic dielectric.

2. A force sensor according to claim 1 wherein:
   said one plurality of conductive elements is removably adhered to said elastic dielectric.

3. A force sensor according to claim 1 wherein:
   said one plurality of conductive elements and said elastic dielectric layer form a structure removably adhered to said other plurality of conductive elements.

4. A force sensor comprising:
   an elastic dielectric;
   a first plurality of compliant conductive elements on one side of said elastic dielectric;
   a second plurality of compliant conductive elements on the opposite side of said elastic dielectric;
   said first and second pluralities of conductive elements being oriented to form a plurality of dielectric separated crossings;
   means for applying first signals to one plurality of conductive elements including means for generating a signal of predetermined frequency and magnitude and means for nonconductively coupling said predetermined magnitude and frequency signal to each conductive element of said one plurality of conductive elements in sequence; and
   means coupled to the other plurality of conductive elements responsive to the predetermined frequency and magnitude signal for producing a sequence of signals each representative of the capacitive impedance between an element of said first plurality of conductive elements and an element of said second plurality of conductive elements at said predetermined frequency; and means responsive to each capacitive impedance signal for generating a signal representative of the separation between an element of said first plurality of conductive elements and an element of said second plurality of conductive elements at the crossing therebetween;

wherein said capacitive impedance signal producing means comprises amplifier means having an input and an output, a predetermined impedance connected to said amplifier means input, an element of said first plurality of conductive elements being coupled to said amplifier means output, and an element of said second plurality of conductive elements being connected to the input of said amplifier means.

5. A force sensor comprising:

an elastic dielectric;

a plurality of separated conformable conductive elements on one side of said elastic dielectric;

a plurality of separated compliant conductive elements on the opposite side of said elastic dielectric;

said plurality of conformable conductive elements and said plurality of compliant conductive elements being oriented to form a matrix of crossings;

means for selectively applying first signals to one plurality of separated conductive elements;

means coupled to said other plurality of separated conductive elements responsive to said first signals for generating second signals representative of the force pattern on said elastic dielectric;

said second signal generating means comprising amplifying means having an input and an output, said amplifying means input being coupled to said one plurality of conductive elements, said amplifying means output being coupled to said other plurality of conductive elements; and means responsive to the signals from said amplifier means output for producing a set of signals representative of the separation between said pluralities of conductive elements at the crossings thereof.

* * * * *